United States Patent
Buescher et al.

(10) Patent No.: US 11,402,128 B2
(45) Date of Patent: Aug. 2, 2022

(54) TEMPERATURE CONTROL FOR GAS WATER HEATERS AND RELATED METHODS

(71) Applicant: SIT MANUFACTURING N.A. S.A. DE C.V., Ciénega de Flores N.L. (MX)

(72) Inventors: Thomas P. Buescher, Webster Groves, MO (US); Daniel L. Furmanek, Ballwin, MO (US); John E. Kopp, Waterloo, IL (US)

(73) Assignee: SIT MANUFACTURING N.A. S.A. DE C.V., Ciénega de Flores N.L. (MX)

( * ) Notice: Subject to any disclaimer, the term of this patent is extended or adjusted under 35 U.S.C. 154(b) by 211 days.

(21) Appl. No.: 16/589,868

(22) Filed: Oct. 1, 2019

(65) Prior Publication Data
US 2021/0095892 A1 Apr. 1, 2021

(51) Int. Cl.
| | |
|---|---|
| *F24H 9/20* | (2022.01) |
| *F24H 1/18* | (2022.01) |
| *F24H 1/08* | (2022.01) |
| *G05D 23/00* | (2006.01) |
| *F23N 5/24* | (2006.01) |

(Continued)

(52) U.S. Cl.
CPC ............. *F24H 9/2035* (2013.01); *F24H 1/08* (2013.01); *F24H 1/186* (2013.01); *G05B 15/02* (2013.01); *F23N 5/242* (2013.01); *F24H 1/18* (2013.01); *F24H 1/48* (2013.01); *F24H 9/20* (2013.01); *F24H 9/2021* (2013.01); *G05D 23/00* (2013.01)

(58) Field of Classification Search
CPC .......... F24H 9/2035; F24H 1/08; F24H 1/186; F24H 1/50; F24H 1/48; F24H 9/20; F24H 1/18; F24H 9/2021; G05B 15/02; G05B 2219/15; G05D 23/00; F23N 5/242; Y10T 137/86389
USPC ........................................ 700/300; 122/14.22
See application file for complete search history.

(56) References Cited

U.S. PATENT DOCUMENTS

| | | | |
|---|---|---|---|
| 3,829,842 A * | 8/1974 | Langdon .............. | G05B 19/058 700/159 |
| 5,660,328 A | 8/1997 | Member | |
| 5,873,518 A | 2/1999 | Richmond | |

(Continued)

FOREIGN PATENT DOCUMENTS

EP  0138171 A2  4/1985

*Primary Examiner* — Michael G Hoang
*Assistant Examiner* — Andrew W Cheung
(74) *Attorney, Agent, or Firm* — Fitch, Even, Tabin & Flannery LLP (57) ABSTRACT

A processor for a controller of a water heater is configured to receive water heater control parameters and an output from a sensor indicating a measured temperature of water in the water heater. The processor is also configured to determine whether to enter an anti-stacking control mode or to enter a demand anticipation control mode. In the anti-stacking control mode the processor is configured to initiate a call for heat when the measured temperature reaches a trigger temperature, calculate a burner on delay value and set a second timer with the calculated value, and calculate a reduced activation time. In the demand anticipation control mode the processor is configured to increase the variable offset based on a frequency of the demand anticipation control mode being activated, initiate a call for heat, and control, based on the reduced activation time or the increased offset value, the burner.

19 Claims, 5 Drawing Sheets

(51) Int. Cl.
*G05B 15/02* (2006.01)
*F24H 1/48* (2022.01)

(56) References Cited

U.S. PATENT DOCUMENTS

| | | | |
|---|---|---|---|
| 8,165,726 B2 | 4/2012 | Nordberg | |
| 8,322,312 B2 | 12/2012 | Strand | |
| 8,485,138 B2* | 7/2013 | Leeland | F24H 1/186 |
| | | | 122/14.22 |
| 9,151,516 B2 | 10/2015 | Buescher | |
| 9,599,369 B2 | 3/2017 | Furmanek | |
| 9,605,872 B2* | 3/2017 | Buescher | B23P 19/00 |
| 9,752,798 B2 | 9/2017 | Buescher | |
| 9,829,897 B2 | 11/2017 | Koopman | |
| 2004/0177817 A1* | 9/2004 | Bradenbaugh | F24H 9/2021 |
| | | | 122/13.01 |
| 2006/0013572 A1 | 1/2006 | Phillips | |
| 2008/0314999 A1* | 12/2008 | Strand | G05D 23/1919 |
| | | | 236/20 R |
| 2010/0300377 A1* | 12/2010 | Buescher | F24H 1/186 |
| | | | 122/14.1 |
| 2012/0118989 A1* | 5/2012 | Buescher | F24H 9/2021 |
| | | | 237/8 A |
| 2013/0092102 A1* | 4/2013 | Chaudhry | F24H 9/2021 |
| | | | 122/14.22 |
| 2014/0060457 A1* | 3/2014 | Hill | F24H 1/186 |
| | | | 122/14.1 |
| 2014/0241708 A1* | 8/2014 | Chaudhry | H05B 3/42 |
| | | | 392/454 |
| 2015/0184889 A1* | 7/2015 | Shaffer | G05D 23/1919 |
| | | | 392/308 |
| 2015/0220091 A1* | 8/2015 | Koopman | F24H 1/205 |
| | | | 700/300 |

* cited by examiner

TEMPERATURE CONTROL FOR GAS WATER HEATERS AND RELATED METHODS

FIELD

The field of the disclosure relates generally to gas water heating devices, and more specifically to electronic control devices for controlling water temperature in the gas water heating device under various conditions.

BACKGROUND

In a typical water heater, cold or ambient temperature water is introduced into the bottom of the water heater tank, where it is detected by a sensor that triggers a call for heat. When a water heater is subjected to repeated short draws of hot water in which the water draw stops shortly after a call for heat is initiated, the water temperature in the tank can stratify and lead to water at the top of the water heater being much hotter than the desired temperature setting. This phenomenon is also referred to as stacking. In prior art applications, stacking is reduced by implementing a relatively large temperature differential setting, such as 20° Fahrenheit (F). That is, with a differential of 20° F., the water temperature as measured by the sensor must drop 20° below a water temperature set-point before a call for heat is initiated. However, over a few hours of inactivity, the water in the tank will cool and any hot water draws made before a call for heat is initiated may result in complaints that the water is too cold.

For example, where a hot water heater is set to 120° F., and the differential is set to 20° F., water in the tank may cool to 101° F. overnight such that any draw of hot water in the morning may be too cold. Thus, large differential settings may result in cold water complaints if there are no hot water draws made over an extended period of time. On the other hand, a narrower differential setting decreases energy efficiency and may cause stacking, as the water heater turns on more often as the water temperature drops over time.

Another problem associated with tank water heating devices relates to changes in demand, especially large draws that are unexpected. The tank may not hold enough water at a sufficient temperature to avoid delivery of water perceived by a user or actually colder than desired. Waiting for the temperature setpoint to be reached before activating the burner may permit the outlet water to reach an undesirably low temperature before the burner can turn the temperature of the outlet water back into an acceptable range.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF SUMMARY

In one aspect, a processor for a controller of a water heater is communicatively coupled to a memory device programmed with instructions such that when the instructions are executed by the processor the processor is configured to receive water heater control parameters, stored in the memory device, by the processor and receive an output from a sensor indicating a measured temperature of water in the water heater. The received water heater control parameters include a default differential value, an anti-stacking differential value, an offset value, an anti-stacking start temperature value, a water temperature rate of change value, a call for heat setpoint value, a number of calls for heat setpoint value, and a number of calls for heat time period setpoint value. The processor is also configured to determine whether to enter an anti-stacking control mode if a setpoint of the controller is set to greater than or equal to an anti-stacking start temperature value minus an offset value or to enter a demand anticipation control mode if a setpoint of the controller is not set to greater than or equal to the anti-stacking start temperature value minus the offset value. In the anti-stacking control mode the processor is configured to initiate a call for heat when the measured temperature reaches a trigger temperature, wherein the trigger temperature is a differential amount less than a set-point temperature, calculate a burner on delay value and set a second timer with the calculated value, and calculate a reduced activation time when the call for heat results in a predetermined number of calls for heat occurring within a predetermined time period. In the demand anticipation control mode the processor is configured to increase the variable offset based on a frequency of the demand anticipation control mode being activated, initiate a call for heat, and control, based on the reduced activation time or the increased offset value, the burner that is configured to heat the water in the water heater.

In another aspect, a water heater includes a storage tank, a sensor configured to measure a temperature of water in the storage tank, a burner configured to heat the water in the storage tank, and a controller communicatively coupled to the sensor and the burner and including a first timer and a second timer. The controller is configured to determine whether to enter an anti-stacking control mode if a setpoint of the controller is set to greater than or equal to an anti-stacking start temperature value minus an offset value or to enter a demand anticipation control mode if a setpoint of the controller is not set to greater than or equal to the anti-stacking start temperature value minus the offset value. In the anti-stacking control mode the controller is configured to initiate a call for heat when the measured temperature reaches a trigger temperature, wherein the trigger temperature is a differential amount less than a set-point temperature, calculate a burner on delay value and set a second timer with the calculated value, the burner configured to heat the water in the water heater, and calculate a reduced activation time when the call for heat results in a predetermined number of calls for heat occurring within a predetermined time period. In the demand anticipation control mode the controller is configured to increase the variable offset based on a frequency of the demand anticipation control mode being activated, initiate a call for heat, and control, based on the reduced activation time or the increased offset value, the burner that is configured to heat the water in the water heater.

In yet another aspect, a method for operating a water heater using a controller includes receiving, by the controller water heater control parameters stored in the memory device, receiving an output from a sensor indicating a measured temperature of water in the water heater, and determining whether to enter an anti-stacking control mode if a setpoint of the controller is set to greater than or equal to an anti-stacking start temperature value minus an offset value or to enter a demand anticipation control mode if a setpoint of the controller is not set to greater than or equal to the anti-stacking start temperature value minus the offset value. In the anti-stacking control mode the method includes initiating a call for heat when the measured temperature reaches a trigger temperature, wherein the trigger temperature is a differential amount less than a set-point temperature. The method also includes calculating a burner on delay value and set a second timer with the calculated value, the burner configured to heat the water in the water heater, and calculating a reduced activation time when the call for heat results in a predetermined number of calls for heat occurring within a predetermined time period. In the demand anticipation control mode the method includes increasing the variable offset based on a frequency of the demand anticipation control mode being activated, initiating a call for heat, and controlling, based on the reduced activation time or the increased offset value, the burner that is configured to heat the water in the water heater.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION

An improved water heating device and controller is described herein. The water heating device has a storage tank, a sensor configured to determine a temperature of water in the storage tank, a burner configured to heat the water in the storage tank, and a controller communicatively coupled to the sensor and the burner. The controller is programmed with at least two algorithms including an anti-stacking control algorithm and a demand anticipation control algorithm. The anti-stacking control algorithm and the demand anticipation control algorithm are used together to reduce stratification of different temperature layers in the water heating device and to counteract the effects of a large load on the water heating device.

The controller is configured to initiate a call for heat when the measured temperature reaches a trigger temperature, wherein the trigger temperature is a differential amount less than a set-point temperature, calculate a reduced activation time when the call for heat results in a predetermined number of calls for heat occurring within a predetermined time period, and control the burner based on the reduced activation time.

The reduced activation time may be calculated using a number of different techniques. In one embodiment, the reduced activation time is calculated by multiplying the differential by a scaling factor. Multiplying the differential by the scaling factor provides a reduced activation time that heats the water to an intermediate temperature between the trigger temperature and the setpoint temperature. The reduced activation time may also be calculated using a previously calculated value for the reduced activation time, retrieved by the controller from, for example, a memory device. In another embodiment, the reduced activation time is calculated as a predetermined percentage of an activation time for the previous call for heat.

Under certain condition, such as when a series of relatively short water draws occur, the water temperature near the top of the water heater tank can increase well above the water temperature set point, which is sometimes referred to as "stacking". "Stacking" occurs when hotter water located at the top of the water heater tank become "stacked" on top of colder water at the bottom of the tank. In some cases, the water at or near the top of the water heater tank may become substantially hotter than the lower temperature water at or near the bottom of the water heater tank.

Water heaters with a single temperature sensor located at or near the bottom of the water heater tank may be particularly susceptible to stacking. The temperature sensor may sense the water temperature at or near the bottom of the water heater tank, which during stacking is less than the water temperature set point, even though the water at or near the top of the water heater tank may be substantially hotter than the water temperature set point. In response, the controller often turns on the heating element of the water heating device. Because only a relatively small amount of colder water may be located at or near the bottom of the water heater tank, particularly in short water draw situations, the resulting heating cycles may be relatively short. Also, the heating cycles may occur relatively often. This operation can create and/or exacerbate water "stacking" in the water heater, which in many cases, is undesirable.

When the anti-stacking control algorithm is executing, the setpoint differential is increased, which permits improved mitigation of the stacking phenomenon. At the same time, the controller continuously attempts to detect a large water draw on the water heating device by analyzing a water temperature rate of change. If the water is detected dropping at a rate exceeding a predetermined rate, for example, 1° F. per 10 seconds for at least a −6° F. delta, then the demand anticipation control algorithm lights the main burner sooner.

In an example, the differential equals 10° F. The large water draw delta temperature is empirically found or assumed to be −6° F., and the large water draw rate must exceed −1° F. per ten seconds. If this rate of change is met, the controller will light the burner at an offset of −6° F., instead of −10° F.

During a stacking situation, the anti-stacking control algorithm is a combination of a first timer circuit, a second timer circuit, and an increase in the setpoint differential. The first timer circuit determines a number of calls for heat within a given time period, if the number of calls for heat within a given time period exceeds a predetermined amount, the controller terminates the combustion process before the water temperature reaches the user selected setpoint. The amount of time the combustion process is allowed to run after initiation is changed as a function of the number of heat calls within a given time period. The user setpoint or offset is not changed. A second timer circuit is used to implement a burner on delay. Additionally, the setpoint differential is increased.

The controller determines that it is in a stacking situation when calls for heat that are too close in time from one another. So, in effect, if calls for heat are too close in time from one another, then, the setpoint differential is increased.

If the controller is in a state where the anti-stacking control algorithm above might run, the demand anticipation control algorithm will not run. Otherwise the controller will determine if the water temperature exceeds a drop rate of 6° F. per minute, and if this condition is met, the burner is activated to heat the water to the user's input temperature selection. If the demand anticipation control algorithm runs too often, the controller modifies the anti-stacking entry requirements to make it more likely to run the anti-stacking control algorithm and less likely to continue running the demand anticipation control algorithm.

The controller continuously attempts to detect a large water draw by analyzing water temperature. A large water draw will be considered detected if the water temperature has dropped at a sufficiently fast enough rate for a sufficiently large enough delta temperature. If the current water temperature is below the current setpoint when the large water draw has been detected then the controller will immediately generate a call for heat.

In an example, the differential might be 10° F. The large water draw delta temperature might be 6° F. and the large water draw rate must exceed −1° F./10 seconds.

Without Anticipation, the water temperature must drop 10° F. below the setpoint for a call for heat to be generated.

With Anticipation, if the water is detected dropping at a rate exceeding 1° F. per 10 seconds for at least −6° F. delta, then the demand anticipation control algorithm lights them main burner sooner than otherwise.

If a large water draw is detected within an hour of the last large water draw a count will be incremented and if this count reaches a threshold then Anticipation will be disabled for some time. During this time the anti-stacking start temperature will be reduced allowing anti-stacking to have a greater chance to run. The purpose of this feature is that running "demand anticipation control algorithm" too often can increase stacking. Putting a limit on the number of times the demand anticipation control algorithm can run within a period of time and expanding when the anti-stacking control algorithm can run if this limit is reached can mitigate this phenomenon.

Changing the setpoint differential allows for a wider operational zone for the anti-stacking control algorithm. Changing the setpoint differential also allows for more easily increasing the amount of anti-stacking without having to modify the timers, so if conditions that indicate stacking are in effect for multiple cycles, the stacking mitigation is easily increased by increasing differential.

Operation of the demand anticipation control algorithm provides the end user with more hot water. The thermistor temperature sensors have a built in thermal delay. The demand anticipation control algorithm eliminates some of this delay and will turn the burner on sooner when a large amount of water is being drawn from the tank. It is, in effect, compensating for a temperature sensor with a known delay. The controller limits the number of times that the demand anticipation control algorithm can run and will use the anti-stacking control algorithm in conjunction with the demand anticipation control algorithm to prevent the demand anticipation control algorithm from creating stacking.

The anti-stacking control algorithm does not shift the setpoint and only manipulates the setpoint differential. The demand anticipation control algorithm detects a rate of change of water temperature but does not use the rate of change of water temperature to shift a setpoint or to shift a differential.

The demand anticipation control algorithm attempts to detect water temperature dropping at a rate (6° F. in 1 minute or less). Upon detection, a call for heat will be forced, as long as the water temperature is less than the setpoint. In this algorithm, the setpoint is not shifted and the differential is also not shifted.

The demand anticipation control algorithm and the anti-stacking control algorithm are connected. The demand anticipation control algorithm tends to cause the tank to stack. The demand anticipation control algorithm is setup to not run if anti-stacking has a possibility of running. If the demand anticipation control algorithm happens to run for multiple calls for heat in a row, the controller shifts the anti-stacking start temperature downward for a time. This is to say, if the demand anticipation control algorithm is triggered too often the requirements to make anti-stacking activate will become more aggressive, and the demand anticipation control algorithm will be less likely to activate for a time.

Figure 1:
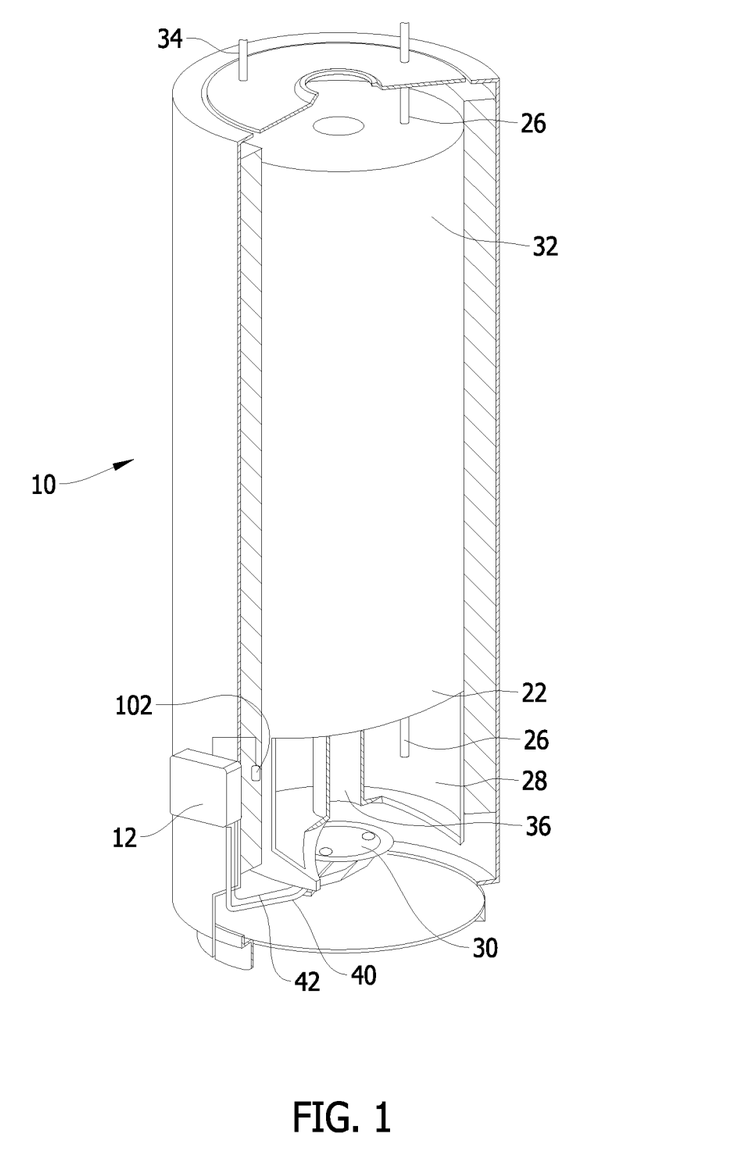
FIG. 1 is a perspective view of a water heater device including an apparatus provided for controlling operation of the water heater device to maintain a desired temperature of water in the water heater device.

FIG. 1 is a perspective view of a water heater device 10 including an apparatus 12 provided for controlling operation of water heater device 10 to maintain a desired temperature of water in water heater device 10. Water heater device 10 has a storage tank 22 that stores heated water and receives cold water via a cold water inlet 26. Cold water entering a bottom portion 28 of storage tank 22 is heated by a fuel-fired burner 30 beneath storage tank 22. Water that is heated leaves storage tank 22 via a hot water outlet pipe 34. Combustion gases from burner 30 leave water heater device 10 via a flue 36. Apparatus 12 provides for control of gas flow via a gas supply line 40 to burner 30, as described herein. Apparatus 12 includes a sensor 102 that provides an output or value that is indicative of a sensed temperature of the water inside of storage tank 22. For example, sensor 102 may be a tank surface-mounted temperature sensor, such as a thermistor. Alternatively, in other embodiments, sensor 102 may be a temperature probe or any other sensor suitable for measuring the water temperature in storage tank 22. In the embodiment shown in FIG. 1, Sensor 102 is positioned proximate bottom portion 28 of storage tank 22, such that cold water entering storage tank 22 from cold water inlet 26 affects the output of sensor 102. Apparatus 12 is positioned, for example, adjacent storage tank 22. Sensor 102 is in communication with apparatus 12, and provides apparatus 12 an output or value indicative of the water temperature in storage tank 22. In some embodiments, a second sensor (not shown) may be disposed at an upper portion 32 of water heater device 10, to provide an output or value that is indicative of a sensed temperature of the water in upper portion 32 of storage tank 22.

Figure 2:
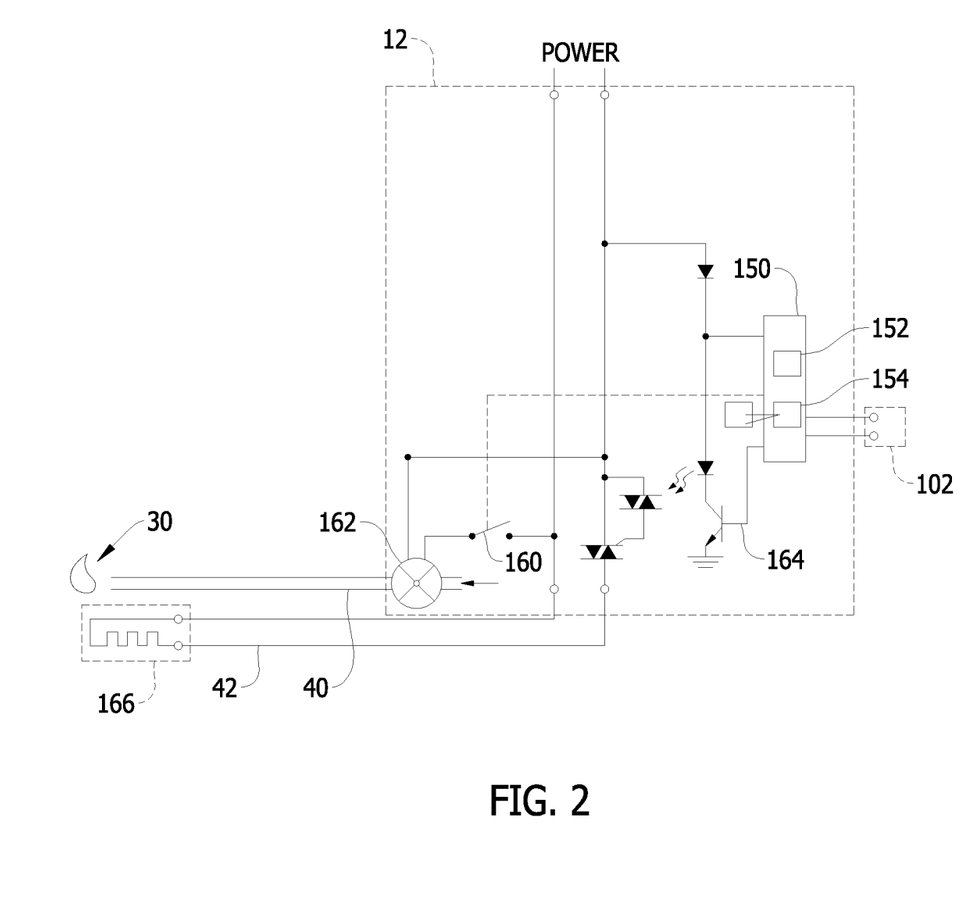
FIG. 2 is a schematic diagram of the apparatus having a controller that is communicatively coupled to the sensor shown in FIG. 1.

FIG. 2 is a schematic diagram of apparatus 12 having a controller 150 that is communicatively coupled to sensor 102. Controller 150 includes a processor 152 and a memory device 154 in this embodiment. Memory device 154 may be used to store values in any of a plurality of data structures 155 formed in memory device 154. Processor 152 is communicatively coupled to sensor 102 and memory device 154. Processor 152 controls operation of controller 150, and accordingly, water heater device 10, as described herein. Executable instructions are stored in memory device 154, and controller 150 performs one or more operations described herein by programming processor 152. For example, processor 152 may be programmed by encoding an operation as one or more executable instructions and by providing the executable instructions in memory device 154.

Processor 152 may include one or more processing units (e.g., in a multi-core configuration). Further, processor 152 may be implemented using one or more heterogeneous processor systems in which a main processor is present with secondary processors on a single chip. As another illustrative example, processor 152 may be a symmetric multi-processor system containing multiple processors of the same type. Further, processor 152 may be implemented using any suitable programmable circuit including one or more systems and microcontrollers, microprocessors, programmable logic controllers (PLCs), reduced instruction set circuits (RISC), application specific integrated circuits (ASIC), programmable logic circuits, field programmable gate arrays (FPGA), and any other circuit capable of executing the functions described herein. In this embodiment, processor 152 controls one or more characteristics of a call for heat, as described herein. As used herein, a 'call for heat' refers to a process that heats water stored in storage tank 22.

Memory device 154 includes one or more devices that enable information such as executable instructions and/or other data to be stored and retrieved. Memory device 154 may include one or more computer readable media, such as, without limitation, dynamic random access memory (DRAM), static random access memory (SRAM), non-volatile random access memory (NVRAM), a solid state disk, and/or a hard disk. Memory device 154 may be configured to store, without limitation, application source code, application object code, source code portions of interest, object code portions of interest, configuration data, execution events and/or any other type of data. In some embodiments, memory device 154 is part of processor 152.

Using processor 152, controller 150 controls at least one gas valve actuator 160 for operating a gas valve 162 to supply gas via supply line 40 to burner 30. In some embodiments, controller 150 may further operate an igniter actuator 164 for actuating an igniter 166 via a connection 42. Controller 150 and more specifically processor 152, monitors sensor 102 and the measured temperature of the water in storage tank 22, and controls operation of burner 30, as described herein.

Specifically, controller 150 facilitates and enables maintaining the temperature of water in storage tank 22 at a set-point temperature. For example, the set-point temperature may be 120° Fahrenheit (F). In this embodiment, when the temperature, as measured by sensor 102, drops to a trigger temperature (e.g., 110° F.), a call for heat is started, or initialized and burner 30 is activated to heat the water. As used herein, the 'differential' refers to the temperature difference between the set-point temperature and the trigger temperature. For example, if the set-point temperature is 120° F. and the trigger temperature is 110° F., the differential is 10° F.

Under default operation, burner 30 is activated until the temperature, as measured by sensor 102, reaches the set-point temperature. However, as explained above, when multiple short draws of hot water are made, the water temperature in storage tank 22 may stratify, leading to water at upper portion 32 having a temperature significantly higher than the set-point temperature. Accordingly, in the embodiments described herein, when repeated calls for heat are made within a relatively short period of time, controller 150 reduces a period of time during which burner 30 is activated, as described herein.

Figure 3:
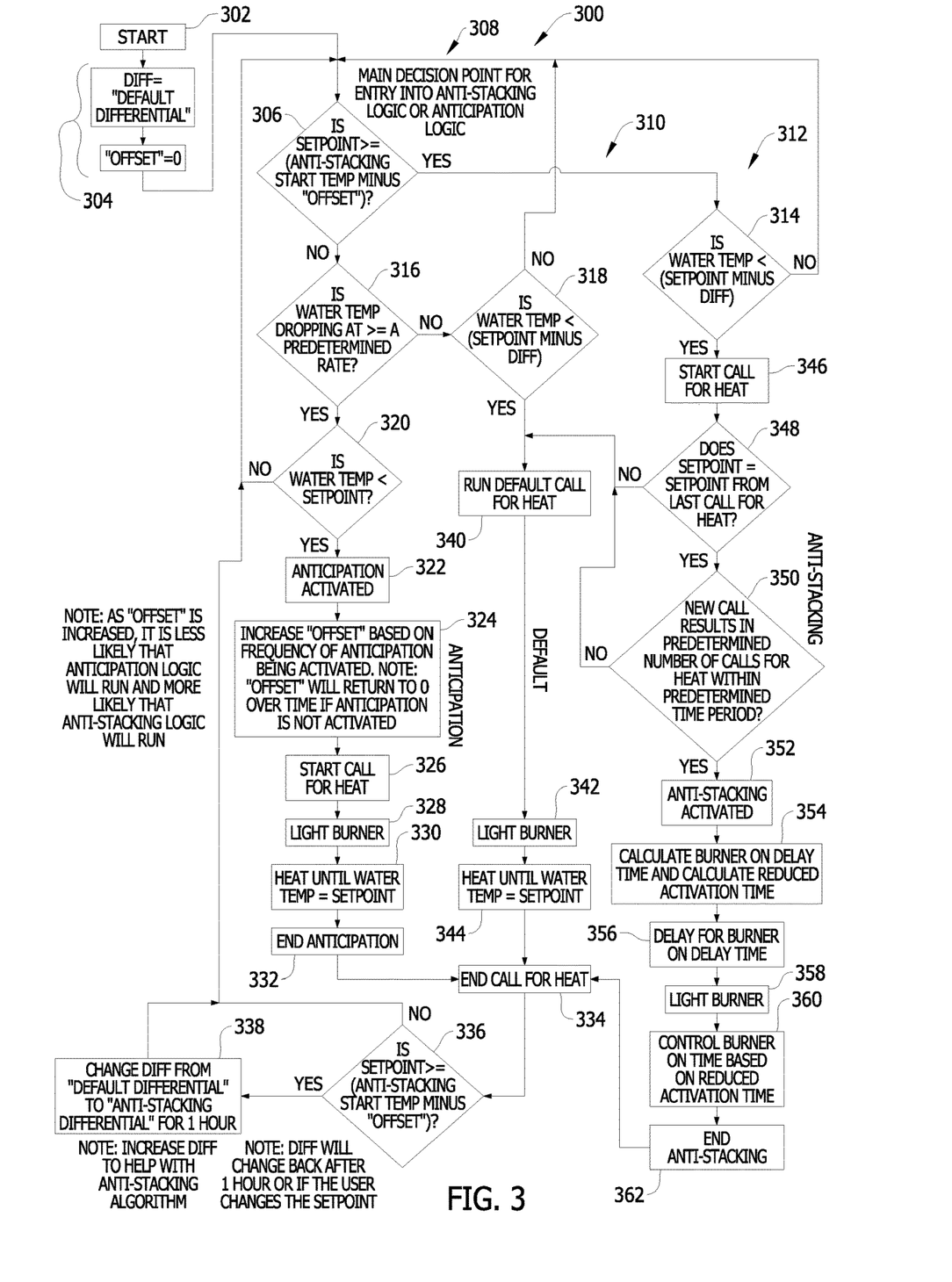
FIG. 3 is a flowchart of an example method of controlling the operation of the controller shown in FIG. 1.

FIG. 3 is a flowchart of an example method 300 of controlling the operation of controller 150 (shown in FIG. 1). Method 300 has three legs, an Anticipation leg 308, a Default leg 310, and an Anti-stacking leg 312. When method 300 starts 302, variables are reset 304 to default values. In the example embodiment, only two variables are shown being reset, a default differential variable, DIFF and an "OFFSET" variable, however other variables may also be included in the variables being reset. At decision block 306, the controller determines if the controller setpoint is greater than or equal to the anti-stacking start temperature minus the Offset, if "yes," processing continues at block 314 in Anti-stacking leg 312. If "no," processing continues in Anticipation leg 308 at block 316, where controller 150 tests whether a large water demand is occurring by determining whether the water temperature in storage tank 22 is dropping at a rate greater than or equal to a predetermined setpoint. If "no," there is no need to execute the demand anticipation control algorithm of Anticipation leg 308 and control shifts to block 318 of Default leg 310, which represents a typical initiation of a call for heat 340, lighting of the burner 342, heating the water until the water temperature equals the setpoint 344, and the call for heat ends 334. If "yes," processing continues to block 320 where controller 150 determines whether the water temperature in storage tank 22 is less than the controller setpoint. If "no," processing reverts back to block 306. If "yes," the demand anticipation control algorithm is activated 322.

The variable OFFSET is increased 324 based on a frequency of the demand anticipation control algorithm being activated. However, the variable OFFSET will return to zero over time if the demand anticipation control algorithm is not activated. Additionally, as the variable OFFSET is increased, it is less likely that the demand anticipation control algorithm will run and more likely that the anti-stacking control algorithm will run.

After the variable OFFSET is increased 324, a call for heat is initiated 326 and the burner is lit 328. The burner heats the water in storage tank 22 until the temperature of the water reaches the setpoint 330. Anticipation ends 332 and the call for heat ends 334. At decision block 336, the controller determines if the controller setpoint is greater than or equal to the anti-stacking start temperature minus the Offset, which is the same check that is done at block 306. If "yes," processing continues at block 338 where the variable DIFF is changed from "default differential" to "anti-stacking differential" for a selectable predetermined amount of time, for example, one hour." In the example embodiment, DIFF is changed from 10° F. to 19° F. in block 338 as part of the anti-stacking algorithm and reducing the temperature at the top of storage tank 22. If "no," processing starts over and continues at block 306.

Further embodiments of the anti-stacking algorithm include:

Scenario 1

Anti-stacking start temp is 140° F. This value is hard-coded and does not usually change.

Offset starts at 0° F.

If the user has the setpoint set to 120° F., then the anti-stacking leg will not usually execute.

Normally the default leg will execute unless the water draw is determined to be a large water draw, block 316.

However if the Anticipation, 322 executes, offset will increase. If the Anticipation leg runs multiple times in a row then offset may become large enough (in this case offset is >=20° F.) that the condition in block 336 is met. In this case the differential will be changed to 19° F. (block 338) for 1 hour and on subsequent calls for heat the Anti-stacking may run because the condition in block 306 is also met.

Scenario 2

Anti-stacking start temp is 140° F.

The user has the setpoint set to 155° F. In this case Anticipation will never run.

Also, initially the differential will be 10° F.

As long as there are infrequent calls for heat (less than 1 call for heat per hour) then the burner will turn on at 145° F. and off at 155° F., the default behavior. Note that even after a default call for heat, the condition in 336 will be met in this case and the differential will shift to 19° F. for one hour. But this won't matter as long as there continues to be less than one call for heat per hour.

For anti-stacking to run, water temp must drop to 155 minus 19° F., or 136° F. to satisfy the condition in 314 and this call for heat must be within an hour of the last call for heat to meet the condition in 350.

If water temp does not reach 136° F. within an hour of the last call for heat, the differential will revert to 10° F. because of the behavior described in 338.

The condition in 314 will then be met if water temp is 145° F. or less, but anti-stacking won't run because 350 won't be met. This call for heat will be a default one.

Referring back to decision block 306, if the controller determines the controller setpoint is greater than or equal to the anti-stacking start temperature minus the Offset, the result is "yes," and processing continues at block 314 in Anti-stacking leg 312. If the water temp is not less than the setpoint minus DIFF, the process returns to decision block 306 to continue processing. If "yes," the temperature is less than the setpoint minus DIFF, a call for heat is initiated 346. At decision block controller 150 checks if the setpoint equals the setpoint from the last call for heat 348. If "no," the call for heat follows the default leg at block 340. If "yes," processing continues to decision block 350 where the controller checks for a predetermined number of calls for heat within a predetermined time period. For example, more than one call for heat within a one hour time period may indicate a stacking event is in progress. Many small draws of water from storage tank 22 over a period of time may cause a temperature gradient to form in storage tank 22. If the predetermined number of calls for heat within a predetermined time period does not exceed a specified threshold range, processing continues in the default leg 310 at block 340. If the predetermined number of calls for heat within a predetermined time period does exceed the specified threshold range, the anti-stacking control algorithm activates 352 and the anti-stacking counter is incremented. In the example embodiment, a burner on delay time value and a reduced activation time value are calculated 354. In one embodiment, burner on delay time value and a reduced activation time value are calculated 354 based on the setpoint and a, number of times anti-stacking has run in a row. In other embodiments, both timers and their lengths are pre-calculated and the values stored in memory. For example, the burner on delay time may be set to 17.0 seconds and the reduced activation time may be set to 2.1 seconds. In some embodiments, the values are derived empirically by testing. In still other embodiments, starting with different values, increasing the burner on delay time and decreasing the reduced activation time as a function of number of times anti-stacking has run in a row is implemented.

A second timer is set with the burner on delay time value 356. After the second timer expires, an "anti-stacking-type" call for heat is initiated, regardless of the current water temperature. The control delays for the burner on delay time. The burner is lighted 358 and the burner is controlled based on the reduced activation time 360. In block 360, the control waits for the water temperature to rise to at least the setpoint minus Differential+1 (water temperature is somewhere within the band between setpoint and differential) and then start the reduced activation timer. When the timer expires the call for heat will be ended. Because the burner is ON and water temperature is rising, the length of the reduced activation timer will approximately determine what temperature the water will reach between the setpoint and the differential. The anti-stacking control algorithm completes 362 when the call for heat ends. At the next call for heat processing may enter the Anti-Stacking leg, 312, again. Processing continues at block 334. Controller 150 operates continuously to execute method 300.

Figure 4:
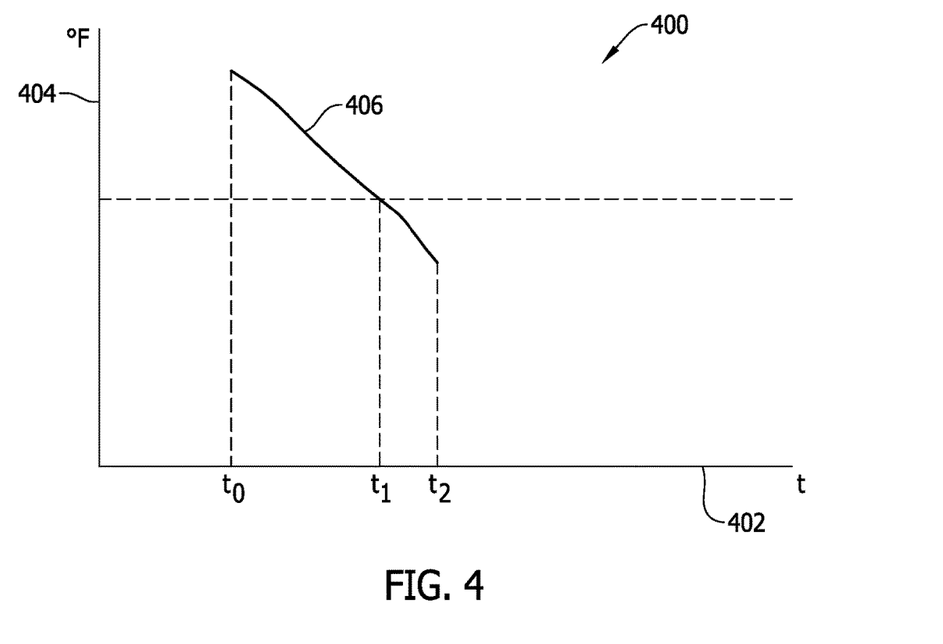
FIG. 4 is a graph of determining whether to activate the demand anticipation control algorithm.

FIG. 4 is a graph 400 of determining whether to activate the demand anticipation control algorithm. In the example embodiment, graph 400 includes an x-axis 402 graduated in units of time and a y-axis 404 graduated in units of temperature. Graph 400 includes a trace 406 of a temperature of the water in storage tank 22. Controller 150 determines whether a large water demand is occurring by determining whether the water temperature in tank 22 is dropping at a rate greater than or equal to a predetermined setpoint. Such a determination may be ascertained by measuring a slope of trace 406. If controller 150 determines the water temperature in tank 22 is dropping at a rate greater than or equal to a predetermined setpoint it then determines whether the water temperature in storage tank 22 is less than the controller setpoint by, in one embodiment, comparing an output of sensor 102 with a value stored in a data structure. If so, the demand anticipation control algorithm is activated 322.

Figure 5:
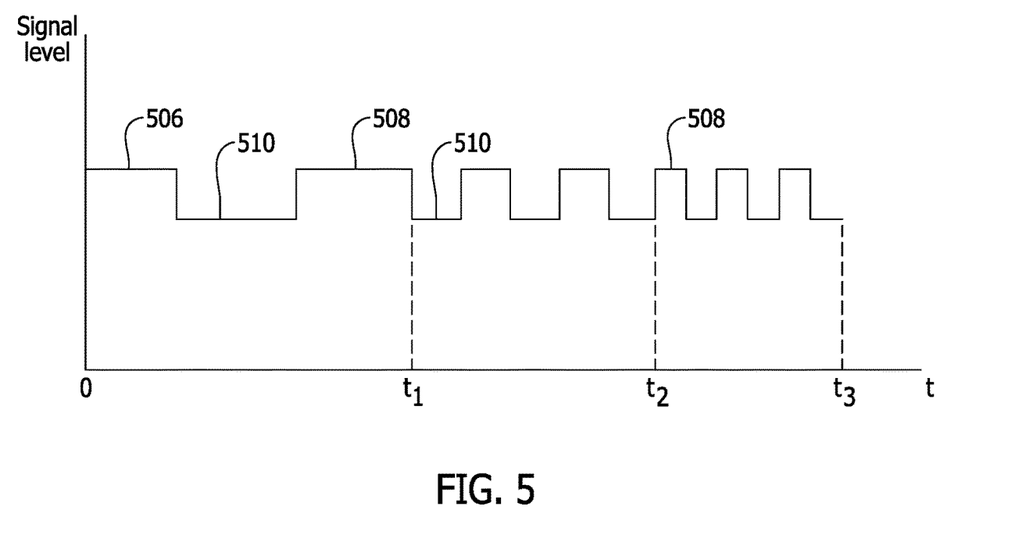
FIG. 5 is a graph illustrating a call for heat signal that may be generated by the controller based on an output of the sensor shown in FIG. 1.

FIG. 5 is a graph 500 illustrating a call for heat signal that may be generated by controller 150 based on an output of sensor 102. In the example embodiment, graph 500 includes an x-axis 502 graduated in units of time and a y-axis 504 graduated in units of signal level. Graph 500 also includes a trace 506 illustrating an example call for heat signal over an amount of time. Trace 506 indicates a call for heat when the call for heat signal is high, illustrated at, for example, 508. Conversely, trace 506 indicates a call for heat when the call for heat signal is low, illustrated at, for example, 510. Over time, the call for heat signal is generated when the temperature of the water in storage tank 22 is reduced below the setpoint and sensor differential. The reduction in water temperature can occur over a relatively long period of time by a loss of heat to ambient, or may take place much more quickly when hot water is drawn from storage tank 22 and replaced by relatively colder water. Under typical use, the call for heat signal may be influenced by infrequent draws and some loss of heat to ambient resulting in a relatively long period between calls for heat as shown between $t_0$ and $t_1$. However, relatively short draws in quick succession resulting in an increased frequency of call for heat signals shown between $t_1$ and $t_2$, or between $t_2$ and $t_3$ can initiate a stacking event. Controller 150 determines when a predetermined number of calls for heat occur within a predetermined time period and then activates the anti-stacking control algorithm when that number is reached.

Figure 6:
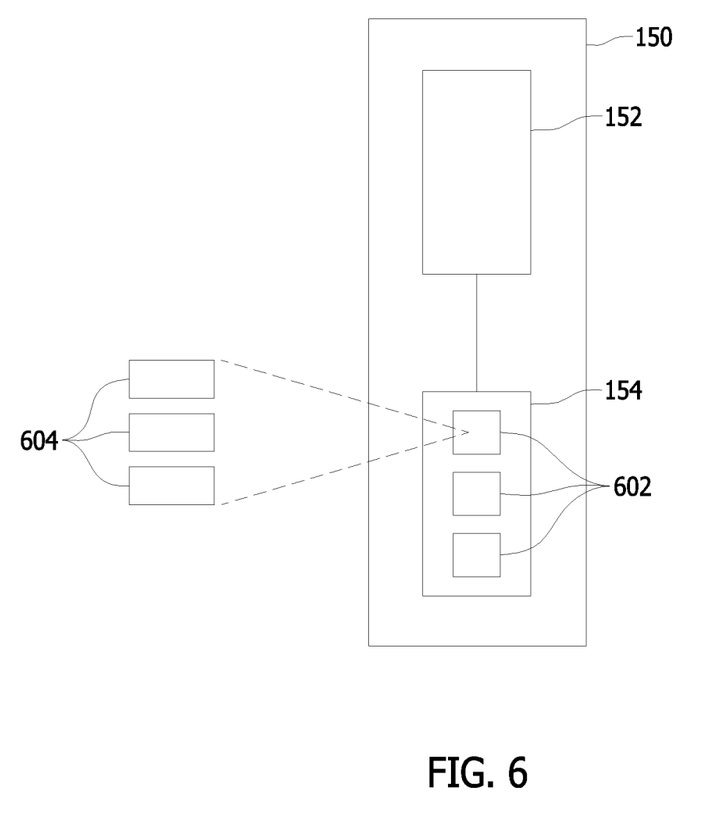
FIG. 6 is a schematic block diagram of the controller shown in FIG. 2.

FIG. 6 is a schematic block diagram of controller 150 (shown in FIG. 2). In the example embodiment, controller 150 includes processor 152 communicatively coupled to memory device 154. Memory device 154 includes a plurality of data structures 602, such as, look-up tables, databases, stacks, arrays, linked lists, and the like. At least one data structure 602 contains timer parameters 604 for timers used in anti-stacking control algorithm and demand anticipation control algorithm. Timer parameters 604 include, for example, but not limited to, a timer duration, an on delay, an off delay, a count-down or count-up configuration, As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

As used herein, a processor may include any programmable system including systems using central processing units, microprocessors, microcontrollers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As will be appreciated based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A processor for a controller of a water heater, the processor communicatively coupled to a memory device programmed with instructions such that when the instructions are executed by the processor, the processor is configured to:
  receive water heater control parameters, stored in the memory device, by the processor;
  receive an output from a sensor indicating a measured temperature of water in the water heater;
  determine whether to enter an anti-stacking control mode if a setpoint of the controller is set to greater than or equal to an anti-stacking start temperature value minus an offset value or to enter a demand anticipation control mode if a setpoint of the controller is not set to greater than or equal to the anti-stacking start temperature value minus the offset value;
  in the anti-stacking control mode:
    initiate a call for heat when the measured temperature reaches a trigger temperature, wherein the trigger temperature is an anti-stacking differential amount less than a set-point temperature;
    calculate a burner on delay value and set a second timer with the calculated value, the burner configured to heat the water in the water heater; and
    calculate a reduced activation time when the call for heat results in a predetermined number of calls for heat occurring within a predetermined time period;
  in the demand anticipation control mode:
    increase the variable offset based on a frequency of the demand anticipation control mode being activated;
    initiate a call for heat; and
  control, based on the reduced activation time or the increased offset value, the burner that is configured to heat the water in the water heater;
  wherein the processor is further configured to determine whether to enter the anti-stacking control mode if the setpoint equals the setpoint from the last call for heat and if a predetermined number of calls for heat have occurred within a predetermined time period.

2. The processor of claim 1, wherein the received water heater control parameters include a default differential value, an offset value, an anti-stacking start temperature value, a water temperature rate of change value, a call for heat setpoint value, a number of calls for heat setpoint value, an anti-stacking differential value, and a number of calls for heat time period setpoint value.

3. The processor of claim 1, wherein the reduced activation time is calculated based on a predetermined scaling factor and wherein the reduced activation time is less than a standard activation time required to heat the water from the trigger temperature to the set-point temperature.

4. The processor of claim 1, wherein the processor is configured to decrease the variable offset to zero if the demand anticipation mode is not activated in a determined period of time.

5. The processor of claim 1, wherein the processor is further configured to monitor the second timer setting and to light the burner at the expiration of the second timer setting.

6. The processor of claim 1, wherein the processor is configured to control the burner such that the burner remains activated for the reduced activation time once the measured temperature reaches a value greater than the trigger temperature.

7. A water heater comprising:
  a storage tank;
  a sensor configured to measure a temperature of water in the storage tank;
  a burner configured to heat the water in the storage tank; and
  a controller comprising a processor communicatively coupled to the sensor and the burner, the controller comprising a first timer and a second timer, the controller configured to:
    determine whether to enter an anti-stacking control mode if a setpoint of the controller is set to greater than or equal to an anti-stacking start temperature value minus an offset value or to enter a demand anticipation control mode if a setpoint of the controller is not set to greater than or equal to the anti-stacking start temperature value minus the offset value;
    in the anti-stacking control mode:
      initiate a call for heat when the measured temperature reaches a trigger temperature, wherein the trigger temperature is an anti-stacking differential amount less than a set-point temperature;
      calculate a burner on delay value and set a second timer with the calculated value, the burner configured to heat the water in the water heater; and
      calculate a reduced activation time when the call for heat results in a predetermined number of calls for heat occurring within a predetermined time period;
    in the demand anticipation control mode:
      increase the variable offset based on a frequency of the demand anticipation control mode being activated;
      initiate a call for heat; and
    control, based on the reduced activation time or the increased offset value, the burner that is configured to heat the water in the water heater;
    wherein the processor is further configured to determine whether to enter the anti-stacking control mode if the setpoint equals the setpoint from the last call for heat and if a predetermined number of calls for heat have occurred within a predetermined time period.

8. The water heater of claim 7, wherein the received water heater control parameters include a default differential value, an offset value, an anti-stacking start temperature value, a water temperature rate of change value, a call for heat setpoint value, a number of calls for heat setpoint value, an anti-stacking differential value, and a number of calls for heat time period setpoint value.

9. The water heater of claim 7, wherein the reduced activation time is calculated based on a predetermined scaling factor and wherein the reduced activation time is less than a standard activation time required to heat the water from the trigger temperature to the set-point temperature.

10. The water heater of claim 7, wherein the processor is configured to decrease the variable offset to zero if the demand anticipation mode is not activated in a determined period of time.

11. The water heater of claim 7, wherein the controller is further configured to activate the burner until the measured temperature reaches the set-point temperature when the call for heat does not result in the predetermined number of calls for heat occurring within the predetermined time period.

12. The water heater of claim 7, wherein the controller is configured to control the burner such that the burner remains activated for the reduced activation time once the measured temperature reaches a value greater than the trigger temperature.

13. The water heater of claim 7, wherein the controller is configured to control the burner such that the burner remains activated for the reduced activation time once the measured temperature reaches a predetermined buffer temperature.

14. A method for operating a water heater using a controller, the method comprising:
- receiving, by the controller water heater control parameters, stored in the memory device;
- receiving an output from a sensor indicating a measured temperature of water in the water heater;
- determining whether to enter an anti-stacking control mode if a setpoint of the controller is set to greater than or equal to an anti-stacking start temperature value minus an offset value or to enter a demand anticipation control mode if a setpoint of the controller is not set to greater than or equal to the anti-stacking start temperature value minus the offset value;
- in the anti-stacking control mode:
  - initiating a call for heat when the measured temperature reaches a trigger temperature, wherein the trigger temperature is an anti-stacking differential amount less than a set-point temperature;
  - calculating a burner on delay value and set a second timer with the calculated value, the burner configured to heat the water in the water heater; and
  - calculating a reduced activation time when the call for heat results in a predetermined number of calls for heat occurring within a predetermined time period;
- in the demand anticipation control mode:
  - increasing the variable offset based on a frequency of the demand anticipation control mode being activated;
  - initiating a call for heat; and
- controlling, based on the reduced activation time or the increased offset value, the burner that is configured to heat the water in the water heaters;

wherein the controller is further configured to determine whether to enter the anti-stacking control mode if the setpoint equals the setpoint from the last call for heat and if a predetermined number of calls for heat have occurred within a predetermined time period.

15. The method of claim 14, wherein receiving water heater control parameters comprises receiving water heater control parameters that include a default differential value, an offset value, an anti-stacking start temperature value, a water temperature rate of change value, a call for heat setpoint value, a number of calls for heat setpoint value, an anti-stacking differential value, and a number of calls for heat time period setpoint value.

16. The method of claim 14, wherein calculating a reduced activation time comprises calculating a reduced activation time calculated based on a predetermined scaling factor and wherein the reduced activation time is less than a standard activation time required to heat the water from the trigger temperature to the set-point temperature.

17. The method of claim 14, further comprising decreasing, by the processor, the variable offset to zero if the demand anticipation mode is not activated in a determined period of time.

18. The method of claim 14, further comprising monitoring the second timer setting and to light the burner at the expiration of the second timer setting.

19. The method of claim 14, wherein controlling a burner comprises controlling the burner such that the burner is activated for the reduced activation time.

* * * * *